Nov. 8, 1949  J. R. HILDRETH  2,487,240
DETACHABLE HANDLE FOR CONTAINERS
Filed Feb. 24, 1947

Inventor
Jack R. Hildreth
by Roberts, Cushman & Grover
att'ys.

UNITED STATES PATENT OFFICE 2,487,240

DETACHABLE HANDLE FOR CONTAINERS

Jack R. Hildreth, Campton, N. H.

Application February 24, 1947, Serial No. 730,411

7 Claims. (Cl. 294—29)

This invention relates to a detachable handle for containers of various kinds and more particularly for the upper bowl of a coffee brewer of the type having upper and lower bowls. After the coffee is made it is necessary to separate the two bowls in order to pour the coffee out of the lower bowl. Because of its peculiar shape and because it gets very hot, the upper bowl has been difficult to handle and breakages have been frequent.

The objects of the present invention are to avoid the aforesaid difficulty and to provide a handle which is simple in economical construction, which is adapted to fit containers of different shape, which can be applied to a container and removed therefrom quickly and easily, and which is durable and reliable in use.

According to the present invention the device comprises a handle having its upper and lower ends extending inwardly into engagement with the container and an intermediate upright position to be held in the hand, the upper end being overhung to extend over the upper edge of the container into engagement with its inner surface, and a clamp pivotally mounted on the handle with its inner end engageable with the outer surface of the container and its outer end extending downwardly along the outside of the handle so that when the outer end and handle are gripped the upper edge of the container is pinched between the upper end of the handle and the inner end of the clamp. Preferably the lower end of the handle extends under the container and non-slip devices are provided for the overhung end of the handle and the inner end of the clamp. The preferred embodiment is adapted for use on a bowl having a side wall which bows outwardly from top to bottom, the aforesaid intermediate portion of the handle bowing outwardly from top to bottom like the bowl and the outer end of the handle bowing outwardly like the intermediate portion of the handle. A secondary feature of the invention consists in that the lower end of the handle is cup-shaped to serve as a measuring cup.

For the purpose of illustration a typical embodiment of the invention is shown in the accompanying drawings in which.

Figure 1:
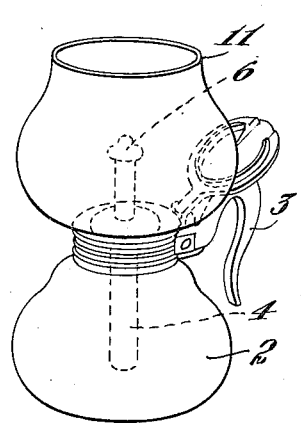
Fig. 1 is a perspective view of a coffee brewer.

The brewer chosen for the purpose of illustration comprises an upper bowl 1, and a lower bowl 2 having a handle 3, the upper bowl having an integral tube 4 depending therefrom with an elastic gasket 5 thereon to fit into the mouth of the lower bowl. To keep the ground from passing from the upper bowl to the lower bowl a filter rod 6 is provided, this rod having an enlargement seating on the bottom of the upper bowl along an annular surface which is roughened sufficiently to permit water to flow from one bowl to the other without permitting the grounds to pass through.

Figure 3:
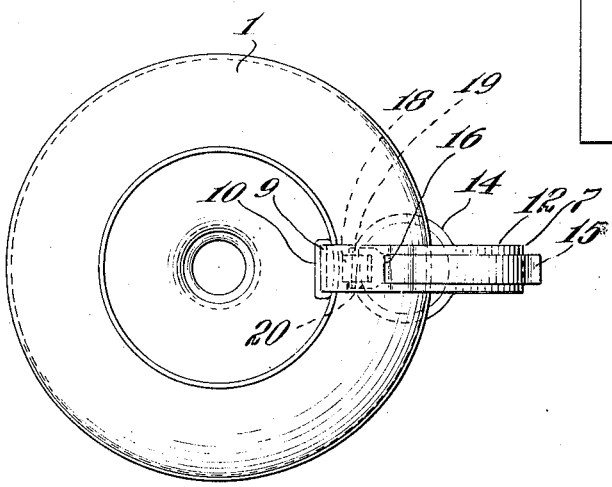
Fig. 3 is a top plan view of the upper bowl and handle.
Figure 4:
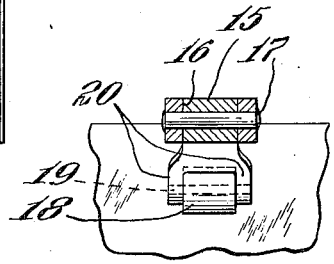
Fig. 4 is a section on line 4—4 at Fig. 2.
Figure 5:
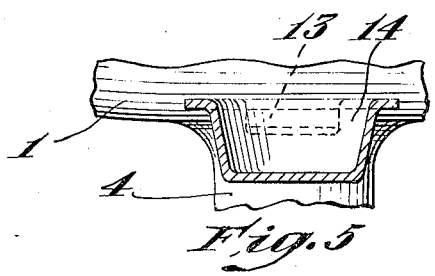
Fig. 5 is a section on line 5—5 of Fig. 2.

The handle of the present invention comprises a central or intermediate portion 7 adapted to be gripped in the hand, the upper end of the handle extending approximately horizontally over the upper edge 11 of the container, the tip 9 of the end being bent downwardly and provided with a non-skid covering 10 of rubber or the like. The lower end of the handle is bent inwardly at 12 and provided with a curved tip 13 engageable under the bowl 1. As shown at 14 the lower end of the handle is cup-shaped for use as a measuring cup when detached from the bowl. Pivotally mounted on the upper end of the handle at 17 is a clamp with an inner end 20 extending into juxtaposition to the bowl and an outer end 15 extending along the outside of the intermediate portion of the handle. As shown in Figs. 3 and 4 the handle is somewhat wider than the clamp and at the pivot point 17 the clamp extends through an opening in the handle. The inner end of the clamp is bifurcated to receive a roller 18 of rubber or other non-skid material which is rotatably mounted on a pin 19. Thus as the inner end of the clamp swings upwardly the roller 18 may roll along the outer side of the container. By virtue of the shape of the parts the horizontal distance between the opposing faces of the non-skid parts 10 and 18 gradually decreases as the inner end of the clamp swings upwardly, and the parts are so proportioned that the bowl is firmly pinched between the parts 10 and 18 before the outer end of the clamp 15 engages the handle 7.

Figure 2:
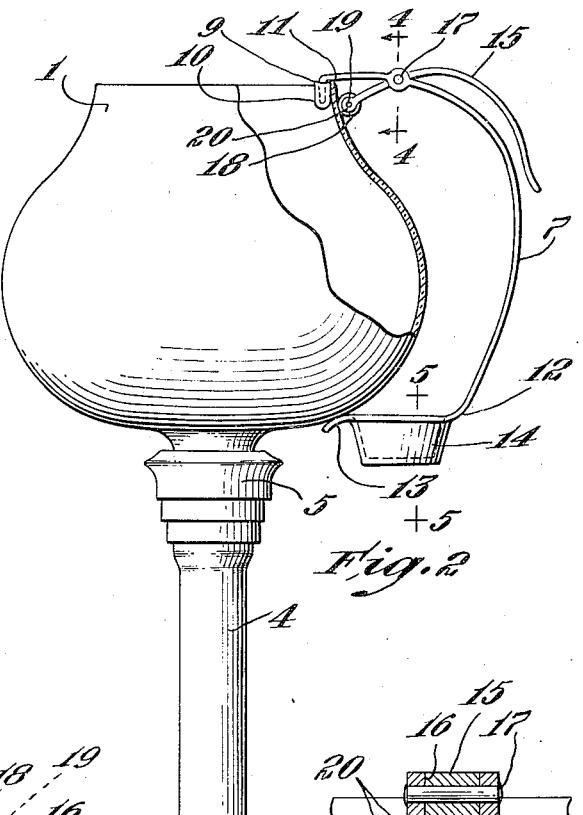
Fig. 2 is a side elevation of the upper bowl with the handle attached.

To apply the handle to a bowl the clamp is swung in a counterclockwise direction about the pivot 17 until the roller 18 is withdrawn a considerable distance from the tip 10. Then the upper end of the handle is hooked over the upper edge of the bowl with the lower end of the handle in engagement with the under side of the bowl as in Fig. 2. Then the grip on the handle and clamp is increased to swing the clamp in a clockwise direction about the pivot 17 until the upper edge of the bowl is tightly pinched as aforesaid. After lifting the upper bowl off the lower bowl it may be deposited where desired merely by releasing the grip on the outer end of the clamp 15 and swinging the handle in a counterclockwise direction about the upper edge of the bowl until the handle can be lifted away from the bowl, this counterclockwise movement of the handle about the upper edge of the bowl causing the clamp to move in a counterclockwise direction about the pivot 17 by virtue of pressure exerted on the roller 18 by the outer side of the bowl. When detached from the bowl the handle may be conveniently used as a measuring cup.

It should be understood that the present disclosure is for the purpose of illustration only and that this invention includes all modifications and equivalents which fall within the scope of the appended claims.

I claim:

1. A device for lifting a container comprising a handle having its upper and lower ends extending inwardly into engagement with the container and an intermediate upright portion to be held in the hand, the upper end being overhung to extend over the upper edge of the container into engagement with its inner surface, and a clamp pivotally mounted on the handle with its inner end engageable with the outer surface of the container and its outer end extending downwardly along the outside of the handle, the handle having a tip extending under the container, so that when said outer end and handle are gripped the upper edge of the container is pinched between the upper end of the handle and the inner end of the clamp with the container resting on said tip.

2. A device for lifting a container comprising a handle having its upper and lower ends extending inwardly into engagement with the container and an intermediate upright portion to be held in the hand, the upper end being overhung to extend over the upper edge of the container into engagement with its inner surface and the lower end extending under the container, and a clamp pivotally mounted on the handle with its inner end engageable with the outer surface of the container and its outer end extending downwardly along the outside of the handle, the handle having a tip extending under the container, so that when said outer end and handle are gripped the upper edge of the container is pinched between the upper end of the handle and the inner end of the clamp with the container resting on said tip.

3. A device for lifting a container comprising a handle having its upper and lower ends extending inwardly into engagement with the container and an intermediate upright portion to be held in the hand, the upper end being overhung to extend over the upper edge of the container into engagement with its inner surface, and a clamp pivotally mounted on the handle with its inner end inclining downwardly into juxtaposition to the outer surface of the container and its outer end extending downwardly along the outside of the handle, the handle having a tip extending under the container, and an elastic roller mounted on said inner end to roll up and down on the outer surface of the container, so that when said outer end and handle are gripped the upper edge of the container is pinched between the upper end of the handle and said roller with the container resting on said tip.

4. A device for lifting a container comprising a handle having its upper and lower ends extending inwardly into engagement with the container and an intermediate upright portion to be held in the hand, the upper end being overhung to extend over the upper edge of the container into engagement with its inner surface, a clamp pivotally mounted on the handle with its inner end engageable with the outer surface of the container and its outer end extending downwardly along the outside of the handle, the handle having a tip extending under the container, and non-slip devices on the overhung end of the handle and the inner end of the clamp, whereby when said outer end and handle are gripped the upper edge of the container is pinched between the upper end of the handle and the inner end of the clamp with the container resting on said tip.

5. A device for lifting a bowl having a side wall which bows outwardly from top to bottom, the device comprising a handle having its upper and lower ends extending inwardly into engagement with the container and an intermediate upright portion to be held in the hand, the upper end being overhung to extend over the upper edge of the container into engagement with its inner surface and the intermediate portion bowing outwardly from top to bottom like the bowl, and a clamp pivotally mounted on the handle with its inner end engageable with the outer surface of the container and its outer end extending downwardly along the outside of the handle, the handle having a tip extending under the container, so that when said outer end and handle are gripped the upper edge of the container is pinched between the upper end of the handle and the inner end of the clamp with the container resting on said tip.

6. A device for lifting a bowl having a side wall which bows outwardly from top to bottom, the device comprising a handle having its upper and lower ends extending inwardly into engagement with the container and an intermediate upright portion to be held in the hand, the upper end being overhung to extend over the upper edge of the container into engagement with its inner surface and the intermediate portion bowing outwardly from top to bottom like the bowl, and a clamp pivotally mounted on the handle with its inner end engageable with the outer surface of the container and its outer end extending downwardly along the outside of the handle, the handle having a tip extending under the container, so that when said outer end and handle are gripped the upper edge of the container is pinched between the upper end of the handle and the inner end of the clamp, the outer end of the clamp bowing outwardly like said intermediate portion of the handle with the container resting on said tip.

7. A device for lifting a container comprising a handle having its upper and lower ends extending inwardly into engagement with the container and an intermediate upright portion to be held in the hand, the upper end extending inwardly approximately horizontally with a depending portion engaging the inner surface of the container, and a clamp pivotally mounted on said upper end of the handle with its inner end inclining downwardly into engagement with the outer surface of the container and its outer end extending downwardly along the outside of the handle, the handle having a tip extending under the container, so that when said outer end and handle are gripped the upper ridge of the container is pinched between the upper end of the handle and the inner end of the clamp with the container resting on said tip.

JACK R. HILDRETH.

REFERENCES CITED

The following references are of record in the file of this patent:

UNITED STATES PATENTS

| Number | Name | Date |
|---|---|---|
| 31,198 | Warner | Jan. 22, 1861 |
| 319,226 | Goff | June 2, 1885 |
| 2,404,224 | Fink | July 16, 1946 |
| 2,416,815 | Calhoun | Mar. 4, 1947 |